United States Patent
Jeong et al.

(10) Patent No.: US 10,986,306 B2
(45) Date of Patent: Apr. 20, 2021

(54) MONITORING CAMERA SYSTEM AND METHOD CAPABLE OF RECORDING IMAGES DURING STORAGE DEVICE RECOVERY

(71) Applicant: Hanwha Techwin Co., Ltd., Seongnam-si (KR)

(72) Inventors: Song Taek Jeong, Seongnam-si (KR); Jin Hyuk Choi, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 166 days.

(21) Appl. No.: 16/332,997

(22) Filed: Mar. 13, 2019

(65) Prior Publication Data

US 2019/0230314 A1    Jul. 25, 2019

Related U.S. Application Data

(63) Continuation of application No. PCT/KR2016/011611, filed on Oct. 17, 2016.

(30) Foreign Application Priority Data

Sep. 13, 2016   (KR) .................. 10-2016-0117990

(51) Int. Cl.
  *G06F 11/00* (2006.01)
  *H04N 5/77* (2006.01)
  (Continued)

(52) U.S. Cl.
  CPC .......... *H04N 5/77* (2013.01); *G06F 11/2094* (2013.01); *G08B 13/19617* (2013.01);
  (Continued)

(58) Field of Classification Search
  CPC .............................. H04N 5/77; G06F 11/2094
  See application file for complete search history.

(56) References Cited

U.S. PATENT DOCUMENTS 7,992,035 B2    8/2011    Daikokuya et al.
8,112,777 B2 *  2/2012    Kim ................. H04N 21/47214
                                                725/54
(Continued)

FOREIGN PATENT DOCUMENTS

JP    2510662 B2      6/1996
JP    2003-259294 A   9/2003
(Continued)

OTHER PUBLICATIONS

Written Opinion (PCT/ISA/237) issued by the International Searching Authority in corresponding International Application No. PCT/KR2016/011611, dated Jun. 7, 2017.
(Continued)

*Primary Examiner* — Katherine Lin
(74) *Attorney, Agent, or Firm* — Sughrue Mion, PLLC

(57) ABSTRACT

A monitoring camera system may include: a camera including an imaging unit for capturing an image of a periphery region according to a first profile, a local storage medium capable of storing the captured image, and a first communication interface for transmitting the captured image; and an image management device including a main storage for storing the transmitted image, a recovery control unit for determining whether a recovery is necessary in the main storage and generating a control signal according to the determination result such that the main storage is recovered, and a computation unit for calculating storable hours for which the image captured according to the first profile can be stored in the local storage medium, according to the determination result, and comparing the calculated storable hours and predicted recovery hours required for recovering the main storage.

16 Claims, 8 Drawing Sheets

(51) Int. Cl.
*G08B 13/196* (2006.01)
*H04N 7/18* (2006.01)
*G06F 11/20* (2006.01)

(52) U.S. Cl.
CPC ............... *H04N 7/18* (2013.01); *H04N 7/181* (2013.01); *H04N 7/183* (2013.01); *G06F 2201/82* (2013.01)

(56) References Cited

U.S. PATENT DOCUMENTS

2013/0219212 A1* 8/2013 Terada ................ G06F 11/3055 714/6.21
2014/0082678 A1 3/2014 Nagai et al.

FOREIGN PATENT DOCUMENTS

| JP | 4111710 B2 | 7/2008 |
| JP | 5472947 B2 | 4/2014 |
| KR | 10-0331042 B1 | 4/2002 |
| KR | 10-1238303 B1 | 2/2013 |
| KR | 101238303 B1 * | 2/2013 |
| KR | 10-2014-0025877 A | 3/2014 |
| KR | 10-2014-0069855 A | 6/2014 |
| KR | 10-1611956 B1 | 4/2016 |
| KR | 10-1651472 B1 | 8/2016 |

OTHER PUBLICATIONS

International Search Report (PCT/ISA/210), issued by International Searching Authority in corresponding International Application No. PCT/KR2016/011611, dated Jun. 7, 2017.

* cited by examiner

MONITORING CAMERA SYSTEM AND METHOD CAPABLE OF RECORDING IMAGES DURING STORAGE DEVICE RECOVERY

CROSS-REFERENCE TO THE RELATED APPLICATION

This application is a continuation of International Patent Application No. PCT/KR2016/011611 filed on Oct. 17, 2016, and claims priority from Korean Patent Application No. 10-2016-0117990 filed on Sep. 13, 2016, the disclosure of which are incorporated herein by reference in their entireties.

BACKGROUND

1. Field

Apparatuses and methods consistent with example embodiments relate to a monitoring camera system and a monitoring method for storing a captured image, and more specifically, a monitoring camera and a monitoring method for temporarily storing an image captured by the camera while a storage device is recovered.

2. Description of the Related Art

Monitoring systems are widely used in various places including banks, department stores, and residential areas. Such monitoring systems are mainly used for crime prevention and security purposes. The most commonly used system of the monitoring systems is a closed-circuit television (CCTV) system, in which a camera is installed at an appropriate position so as to photograph a region to be monitored and a user monitors an image captured by the camera.

In storage devices such as a network video recorder (NVR) and a digital video recorder (DVR) in which data is continuously input/output, high capacity is required, and the data needs to be stored without discontinuity, stability is very important. Therefore, instead of using only one fixed storage medium such as a hard disk drive (HDD) and a solid state drive (SSD), a plurality of storage devices are used in a redundant array or are combined in an array and used.

A configuration in which a plurality of storage media are connected is not formed by merely connecting the storage media. However, there may be a need for an operation of integrally combining storage media to constitute a storage device such that the storage device is logically recognized as one storage medium.

After the storage device is integrally constituted once, the storage device should be continuously maintained without a change in configuration thereof. However, when there is a data error in an HDD, the storage device is rebooted, a failed HDD is replaced, the initial integrated configuration is released. When the configuration is released, a rebuilding (or resync) operation of re-building the configuration may be necessary. The rebuilding operation usually takes a long time such as one day or more.

However, since there is no available storage device during the rebuilding, although a monitoring camera transfers an image to the storage device, the image may not be stored. Therefore, all images captured during the rebuilding are lost, which is fatal in a field such a CCTV field in which continuous monitoring is important. This is true even when the rebuilding is necessary, even when there is a problem with a storage medium itself due to an impact, and even when an image is not properly stored due to a network problem.

In addition, a status of the storage device entering a rebuilding process may be confirmed when a user accesses a status confirmation menu, but there is no component which directly notifies a user of the status of the storage device. Therefore, it may be too late when the user realizes that the user may not obtain any result from search for an image captured since the image was captured during the rebuilding process.

SUMMARY

One or more example embodiments provide a method and an apparatus for storing a monitoring image without loss of data even when a storage device is recovered.

Further, one or more example embodiments provide a method and an apparatus for notifying a user of a recovery situation so that the user may take appropriate measures.

According to an aspect of an embodiment, there is provide a monitoring camera system including: a camera device comprising: a camera configured to capture an image according to a first camera profile, a local storage medium configured to store the image, and a first communication interface configured to transmit the image; a main storage device configured to store the image that is transmitted from the first communication interface; and one or more processors including: a recovery control unit configured to determine whether a recover of the main storage device is necessary and generate a control signal to recover the main storage device in response to determining that the recovery of the main storage device is necessary, and a calculation unit configured to calculate a storable time for which the image captured according to the first camera profile is storable in the local storage medium in response to determining that the recovery of the main storage device is necessary, and compare the calculated storable time with an estimated recovery time for recovering the main storage device.

When the estimated recovery time is shorter than or equal to the calculated storable time, the local storage medium may start to store the image captured according to the first camera profile, and the main storage device includes a recovery unit configured to recover the main storage device in response to the control signal.

The camera device may further include a profile setting unit configured to, in response to determining that the estimated recovery time is longer than the calculated storable time, generate a second camera profile for capturing another image that is storable in the local storage medium for a time shorter than or equal to the estimated recovery time, the local storage medium may start to store the image captured according to the second camera profile, and the main storage device may include a recovery unit configured to recover the main storage device in response to the control signal.

The profile setting unit may be further configured to generate the second camera profile based on criteria including at least one of a resolution, a codec, and a frame rate.

The profile setting unit may be further configured to sequentially adjust the criteria to generate the second camera profile.

When the recovery is completed, the image stored in the local storage medium may be transferred to the main storage device through the first communication interface, and the main storage device may start to store the image captured according to the first camera profile.

The one or more processors may further include a notification unit configured to transmit a message to a user when the control signal for receiving the main storage device is generated.

The monitoring camera system may further include an input interface to allow a user to select a camera profile from a plurality of profiles including the first camera profile, in response to the estimated recovery time being longer than the calculated storable time.

The camera device may be further configured to detect an event, and capture the image in response to the event being detected.

When the estimated recovery time is longer than the calculated storable time, the local storage medium may start to store the captured image, the main storage device may include a recovery unit configured to recover the main storage device in response to the control signal, and when a remaining capacity of the local storage medium runs out before the main storage device is recovered, the camera device may detect an oldest image among a plurality of images stored in the local storage medium.

According to an aspect of another embodiment, there is provided a monitoring method including: storing an image captured by a camera in a main storage device; starting to recover the main storage device in response to determining that a recovery of the main storage device is necessary; and when the recovery is started, calculating a storable time for which the image captured according to a current camera profile is storable in a local storage medium of the camera and comparing the calculated storable time with an estimated recovery time for recovering the main storage device.

The monitoring method may further include, when the estimated recovery time is shorter than or equal to the calculated storage time, starting to store the captured image in the local storage medium.

The monitoring method may further include, when the estimated recovery time is longer than the calculated storage time, generating a second camera profile for capturing another image that is storable in the local storage medium for a time shorter than or equal to the estimated recovery time, and starting to store, in the local storage medium, the image captured according to the second camera profile.

The current camera profile may be a first camera profile. The monitoring method may further include, when the recovery is completed, transferring the image stored in the local storage medium to the main storage device through a first communication interface, and resuming storing the image captured according to the first camera profile, in the main storage device.

The generating the second camera profile may include sequentially adjusting criteria for generating the second camera profile, wherein the criteria comprise a resolution, a codec, and a frame rate for generating the second camera profile. The monitoring method may further include: calculating another storable time for which another image captured according to the second camera profile is storable in the local storage medium; comparing the storable time calculated based on the second camera profile with the estimated recovery time; and when the storable time calculated based on the second camera profile is longer than or equal to the estimated recovery time, storing the image captured according to the second camera profile, in the local storage medium.

The generating the second camera profile may include sequentially adjusting the resolution, the codec, and the frame rate.

According to an aspect of another embodiment, there is provided a camera device including: a camera configured to capture an image according to a first camera profile; a first communication interface configured to transmit the captured image to an image management device; a local storage medium configured to store the captured image; one or more processors including: a recovery control unit configured to determine whether a recovery of the first communication interface is necessary and generate a control signal for recovering the first communication interface in response to determining that the recovery of the first communication interface is necessary; and a calculation unit configured to calculate a storable time for which the image captured according to the first camera profile is storable in the local storage medium in response to determining that the recovery of the first communication interface is necessary, and compare the calculated storable time with an estimated recovery time for recovering the first communication interface.

When the estimated recovery time is shorter than or equal to the calculated storable time, the recovery control unit may generate a signal for allowing the local storage medium to start to store the captured image, and the first communication interface may include a communication recovery unit to recover the first communication interface in response to the control signal.

The camera device may further include a profile setting unit configured to, in response to the estimated recovery time being longer than the calculated storable time, generate a second camera profile for capturing another image that is storable in the local storage medium for a time shorter than or equal to the estimated recovery time. The recovery control unit may be further configured to generate a signal for allowing the local storage medium to start to store an image captured according to the second profile. The first communication interface may include a communication recovery unit configured to recover the first communication interface in response to the control signal.

When the recovery is completed, the image stored in the local storage medium may be transferred to the main storage device through the first communication interface.

According to various example embodiments of the present application, data captured by a camera may be stored without discontinuity while a storage device is recovered.

A user can be notified of a recovery situation and can take appropriate measures.

Technical benefits of the embodiments of the present application are not limited to the above-mentioned effects and further effects not described above will be clearly understood by those skilled in the art.

DESCRIPTION OF THE DRAWINGS

The above and/or other aspects will be more apparent by describing certain example embodiments, with reference to the accompanying drawings, in which.

DETAILED DESCRIPTION

Figure 1:
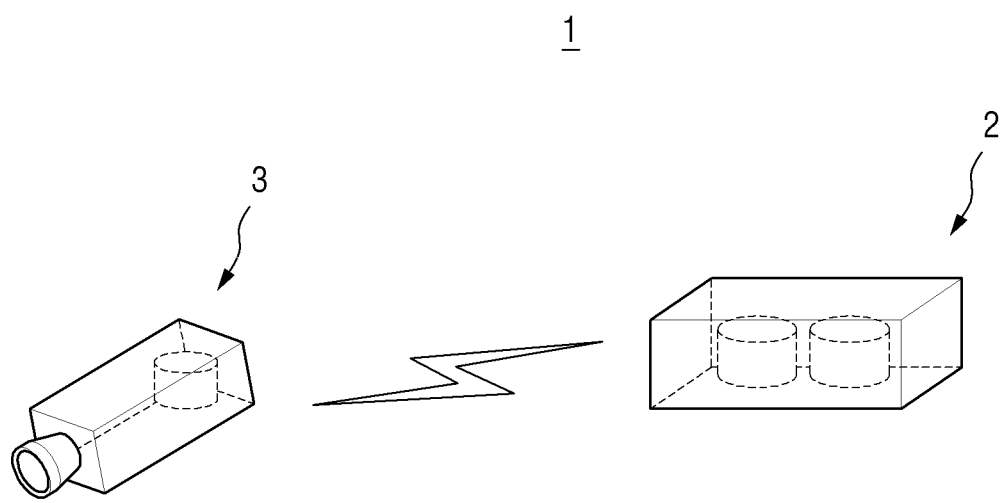
FIG. 1 is a schematic view illustrating an overall configuration of a monitoring camera system according to an example embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Unless otherwise defined, all terms (including technical and scientific terms) used in the present specification may be used as the same meaning which may be commonly understood by the person with ordinary skill in the art. It will be further understood that terms defined in commonly used dictionaries should not be interpreted in an idealized or excessive sense unless expressly and specifically defined.

The terms used in the present specification are for explaining the example embodiments rather than limiting the embodiments. As used herein, the singular forms "a," "an," and "the" are intended to include the plural forms as well, unless the context clearly indicates otherwise. The meaning of "comprises" and/or "comprising" used in this specification does not exclude the existence or addition of one or more other constituent elements in addition to the mentioned constituent elements.

The example embodiments in the present specification will be described with reference to cross-sectional and and/or schematic views. Therefore, a form of the drawings by production technology and/or an allowable error may be changed. In the drawings, various components may be exaggerated or reduced in consideration of convenience of description. Like reference numerals refer to like elements throughout the specification. The terminology "and/or" includes any one or combination of a plurality of the associated listed items.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

It will be understood that the spatially relative terms are intended to encompass different orientations of elements in use or in operation in addition to the orientation depicted in the figures. Since an element may be oriented in another direction, the spatially-relative terms may be interpreted in accordance with the orientation of the element.

Hereinafter, configurations of example embodiments will be described in detail with reference to the accompanying drawings.

FIG. 1 is a schematic view illustrating an overall configuration of a monitoring camera system 1 according to a first example embodiment.

Referring to FIG. 1, the monitoring camera system 1 includes an image management device 2 and a camera 3. The image management device 2 may be a digital video recorder (DVR) or a network video recorder (NVR) and may be a device including a management system having video management software (VMS), but the present embodiment is not limited thereto. In addition, the camera 3 may be a general box-type camera, but the present embodiment is not limited thereto. The camera 3 may be a pan/tilt/zoom (PTZ) camera, a digital automatic pan/tilt/zoom (DPTZ) camera, a 4K camera having a horizontal display resolution of approximately 4,000 pixels, a fisheye camera, a dome-type camera, a zoom camera, or the like.

The image management device 2 and the camera 3 may be connected to each other in a wired or wireless manner so as to communicate with each other. The image management device 2 and the camera 3 may exchange information.

An image captured by the camera 3 is transmitted to the image management device 2, and the image management device 2 receives and stores the image. A user may access the image captured by the camera 3 using the image management device 2 and may monitor an area under surveillance via the camera 3.

In addition, the image management device 2 transmits to the camera 3, a control signal for controlling the camera 3, and the camera 3 performs an operation in response to the received control signal. Therefore, the user may control the camera 3 using the image management device 2.

Although the example embodiment has been described that only one camera 3 communicates with the image management device 2, the number of cameras 3 is not limited thereto, and a plurality of cameras 3 may be connected to one image management device 2 and may also be connected to a plurality of image management devices 2.

Hereinafter, a configuration of the image management device 2 will be described in more detail with reference to FIG. 2.

Figure 2:
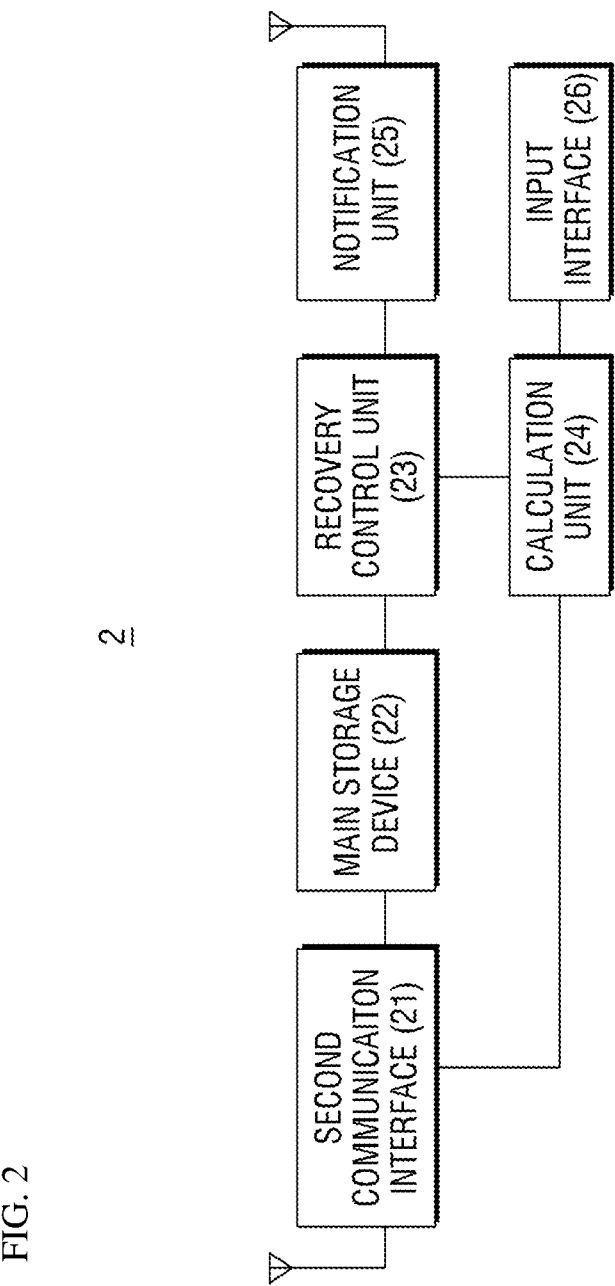
FIG. 2 is a block diagram illustrating a configuration of an image management device according to an example embodiment.

FIG. 2 is a block diagram illustrating the configuration of the image management device 2 according to the example embodiment.

Referring to FIG. 2, the image management device 2 includes a second communication interface 21, a main storage device 22, a recovery control unit 23, a calculation unit 24, a notification unit 25, and an input interface 26 according to some example embodiments. The recovery control unit 23 and the calculation unit 24 may be included in one or more processors such as microprocessors. The notification unit 25 may be also referred to as an output interface, and may be realized as a graphic user interface, a speaker, a display, and/or a haptic motor.

The second communication interface 21 interworks with the camera 3 shown in FIG. 1 and functions as a component configured to receive the captured image transmitted from the camera 3. A first communication interface 31 is included in the camera 3 so as to correspond to the second communication interface 21. In addition, as will be described below, the second communication interface 21 may receive remaining capacity information of a local storage medium 34 included in the camera 3 and may receive a time for which an image captured according to a current profile is storable in the local storage medium 34. The second communication interface 21 may receive profile information with which the image capture unit 35 currently captures an image. The second communication interface 21 may not only receive the above-described information but may transmit new information input by a user through the input interface 26 to the camera 3. In addition, the second communication interface 21 may transmit a control signal for allowing the local storage medium 34 to store a captured image. In addition, a manner in which the camera 3 and the image management device 2 exchange information is realized by the first communication interface 31 and the second communication interface 21 exchanging the information.

The second communication interface 21 may be connected to the first communication interface 31 in a wired or wireless manner or through a network. Therefore, a network module constituting the second communication interface 21 may include a third generation (3G) modem or a Long-Term Evolution (LTE) modem, which is a wireless network module and may use other methods such as ZigBee, wireless local area network (WLAN), and Bluetooth. A wired network module may include an Ethernet card (or a network interface controller (NIC) card) or a chip, but the present embodiment is not limited thereto.

The main storage device 22 is a device for storing a captured image and includes a large capacity storage device. In addition, the main storage device 22 stores the captured image and provides the captured image so as to be viewed according to external requests.

A single large capacity storage medium may be used as the main storage device 22, and the main storage device 22 may be configured in such a manner that a plurality of storage media 224 are integrally combined to be logically recognized as one storage medium 224. A configuration of the main storage device 22 will be described in detail with reference to FIG. 3 below.

The recovery control unit 23 is a component that is connected to the main storage device 22, determines whether the main storage device 22 has failed and whether recovery is necessary for the main storage device 22. For example, the recovery control unit 23 may determine whether the main storage device 22 has failed by applying error checking and correcting (ECC) codes across all memory locations. When it is determined that the recovery is necessary, the recovery control unit 23 transmits to the main storage device 22, a control signal for recovering the main storage device 22. When the main storage device 22 has an integrated configuration of the plurality of storage media 224, the recovery control unit 23 determines whether rebuilding is necessary. When it is determined that the rebuilding is necessary, the recovery control unit 23 transmits to the main storage device 22, a control signal for rebuilding the main storage device 22. In the present disclosure, the term "recovery" of the recovery control unit may have a meaning of "rebuilding" of the integrated configuration of the plurality of storage media 224.

Specifically, the recovery control unit 23 is connected to the main storage device 22 to determine in real time or periodically determine at a certain inspection interval whether there is an error or a change in the main storage device 22. In the case of recovery being required, there is an error in stored data, damage to a specific hard disk, an external impact, a defect due to sudden power cut-off, or damage to a substrate, a disk fail, or degradation of a hard disk. In addition, when the main storage device 22 includes the plurality of storage media 224, the recovery may be necessary when the storage medium 224 is added in the integrated configuration or replaced, but the present embodiment is not limited thereto. The recovery control unit 23 receives data for determining whether recovery is necessary from the main storage device 22. A chip on the main board of the NVR manages the basic operation of the main storage device 22 (RAID). If the chip sends an information to the NVR Application about whether the recovery (rebuilding) situation exists or not, the recovery control unit 23 of a monitoring camera connected to the NVR or the NVR monitors this information and determines the situation.

When it is determined that the recovery is not necessary through such a determination process, determination like previous determination is performed in real time or periodically. When it is determined that the recovery is necessary, the recovery should be performed. Thus, a control signal for recovering the main storage device 22 is generated and transferred to the main storage device 22. The main storage device 22 includes a recovery unit 222 to be described below. Thus, when the control signal is received, the recovery unit 222 recovers the main storage device 22.

In addition, when it is determined that the recovery is necessary, a control signal is transferred to the calculation unit 24 such that the calculation unit 24 calculates an estimated recovery time required for the recovery and calculates a storable time for which an image is storable in the local storage medium 34 of the camera 3. When it is determined that the recovery is not necessary, there is no reason for the calculation unit 24 to perform such a calculation for comparison. Thus, the transmission of the control signal may be omitted when the recovery control unit 23 determines that the recovery is not necessary.

When it is determined that the recovery is necessary, the recovery control unit 23 transfers a control signal and recovery related information to the notification unit 25 so as to notify a user that the recovery is currently necessary. The notification unit 25 receiving the control signal may transmit a message to the user. When the main storage device 22 is being recovered, the notification unit 25 may provide the user with a message indicating that the recovery is currently in progress.

The recovery control unit 23 receives information from the recovery unit 222 whether the recovery is completed and transfers a control signal to a profile setting unit 32 so as to start to capture an image according to an original profile (i.e., a first profile) from a recovery completion time. In addition, a control signal is transferred such that the image captured according to the first profile is stored in the main storage device 12 rather than the local storage medium 34. Furthermore, an image stored in the local storage medium 34 is transferred to the main storage device 12. As described above, after a post-recovery process is completed, the process returns to the beginning to determine whether recovery is necessary for the main storage device 22.

The calculation unit 24 is a component that receives a control signal from the recovery control unit 23, calculates an estimated recovery time required for recovery and a storable time for which an image is storable in the local storage medium 34 of the camera 3, and compares the estimated recovery time and the storable time with each other.

Pieces of information, which are related to a cause by which recovery is currently necessary, a degree of performance of the recovery unit 222 included in the main storage device 22, the number of storage media 224 to be rebuilt when the recovery is rebuilding, a recovering method, and an amount of data currently stored in the main storage device 22, may be required for calculating the estimated recovery time, but the present embodiment is not limited thereto. The pieces of information required for the calculating may be received from the recovery control unit 23 or may be information pre-stored in the calculation unit 24.

When there is information such as the above-described information through which a cause of problems may be inferred and it is possible to grasp a cause of a fault, the calculation unit 24 may calculate the estimated recovery time using the above-described information. The estimated recovery time may be equal to an actual recovery time but may not match the actual recovery time. This is because actual recovery is influenced by parameters which are not considered in a calculation operation and the estimated recovery time is calculated based on the above-described information from experience.

When the calculation unit 24 may not grasp the cause of the fault, the calculation unit 24 may not calculate the estimated recovery time. Therefore, in such a case, a user may input a minimum storage time in advance in a setting operation so as to be used as the estimated recovery time. Here, the minimum storage time is a time set by the user and means at least a length of a time for which an image is desired to be stored while the main storage device 22 is recovered due to a fault thereof.

The storable time for which the image is storable in the local storage medium 34 included in the camera 3 may be calculated by receiving remaining capacity information of the local storage medium 34 and current profile information through the first communication interface 31 and the second communication interface 21. When an image is captured according to a current profile, a size of a required storage space per time may be calculated, and the storable time may be calculated by dividing the remaining capacity of the local storage medium 34 by the calculated size. However, a method of calculating the storable time is not limited thereto. Since the camera 3 recognizes both of the remaining capacity information of the local storage medium 34 and the current profile information, the method of calculating the storable time may be variously modified, and specifically, the above-described calculation may be performed and transferred to the calculation unit 24.

The calculation unit 24 compares the estimated recovery time and the storable time obtained through such processes. When the estimated recovery time is longer than the storable time, the calculation unit 24 transfers a control signal to the profile setting unit 32 included in the camera 3 to be described below so as to generate a new profile. The profile setting unit 32 generates a second profile having a longer storable time from the first profile. When the profile setting unit 32 generates a second profile which is a new profile and transmits information on the new profile to the calculation unit 24 through the first communication interface 31 and the second communication interface 21, the calculation unit 24 calculates and compares an estimated recovery time and a storable time based on the second profile again. Such a process is repeated until the storable time becomes longer than or equal to the estimated recovery time. When a profile, which allows the storable time to be longer than or equal to the estimated recovery time, is found, the calculation unit 24 may transfer a control signal to the camera 3 through the second communication interface 21 and the first communication interface 31 such that the image capture unit 35 captures an image according to the found profile and stores the captured image in the local storage medium 34.

When such a condition is not satisfied in a state in which there is no more profile to be generated, the calculation unit 24 may transfer a control signal to the camera 3 through the first communication interface 31 and the second communication interface 21 such that the image capture unit 35 captures an image according to a generated final profile and stores the captured image in the local storage medium 34.

The calculation unit 24 compares the estimated recovery time and the storable time obtained through such processes. When the estimated recovery time is shorter than or equal to the storable time, the calculation unit 24 may transfer a control signal to the camera 3 through the second communication interface 21 and the first communication interface 31 so as to store an image captured according to a current profile in the local storage medium 34. This is because there is no problem in capturing an image according to the current profile and storing the captured image in the local storage medium.

The method and criterion by which the profile setting unit 32 generates a new profile will be described in detail with reference to FIGS. 4, 6, and 7. The notification unit 25 functions to receive a control signal for notifying that recovery is started by the recovery control unit 23, receive information related to a recovery situation, and transmit a message including the information to the user or provide an alarm to the user.

Therefore, in order to transmit a message through a method such as a short message service (SMS), a multimedia messaging service (MMS), or an email, the notification unit 25 may include a 3G modem or an LTE modem and may use other methods such as ZigBee, WLAN, and Bluetooth. In addition, since an alarm may be used to notify the user of the message, the notification unit 25 may include a sound-making tool or may use a method of flashing warning light using a light-emitting diode (LED).

The input interface 26 is a component that displays a profile configuration to the user and directly receives the profile configuration from the user. The input interface 26 may display at least one thumbnail image of an image captured according to a current profile received from the camera 3 to the user in addition to a user interface for user convenience. The input interface 26 may be a portable and mobile device such as a smartphone, a tablet PC, a laptop, or the like, but the present embodiment is not limited thereto. The input interface 26 may be a stationary device such as a desktop, video wall, or the like.

The input interface 26 may not provide a touch function, and in this case, an inputter is separately provided. Examples of the most common inputter include a mouse, a keyboard, a joystick, and a remote controller. When the input interface 26 provides the touch function, the input interface 26 may include a touch sensor. The touch sensor is integrally mounted with the input interface 26. The touch sensor senses a touch generated in the input interface 26, detects coordinates of a region in which the touch is generated, and detects the number of times and intensity of the touch. The touch sensor may transfer a detection result to the calculation unit 24, and the calculation unit 24 may calculate a storable time based on information on a pre-stored profile. Alternatively, the calculation unit 24 may transfer the detection result to the profile setting unit 32 of the camera 3 through the second communication interface 21 and the first communication interface 31 and may receive information on a corresponding profile again. Although a monitoring system provides a touch function, when the input interface 26 does not include a touch sensor, a separate touch pad may be provided. A touch may be performed using a finger, but the present embodiment is not limited thereto. The touch may be performed using a stylus pen equipped with a tip through which a minute current may flow. Such a user input is performed through the input interface 26.

An operation of the input interface 26 will be described in more detail with reference to FIGS. 8 and 9.

Hereinafter, a configuration of the main storage device 22 will be described in more detail with reference to FIG. 3.

Figure 3:
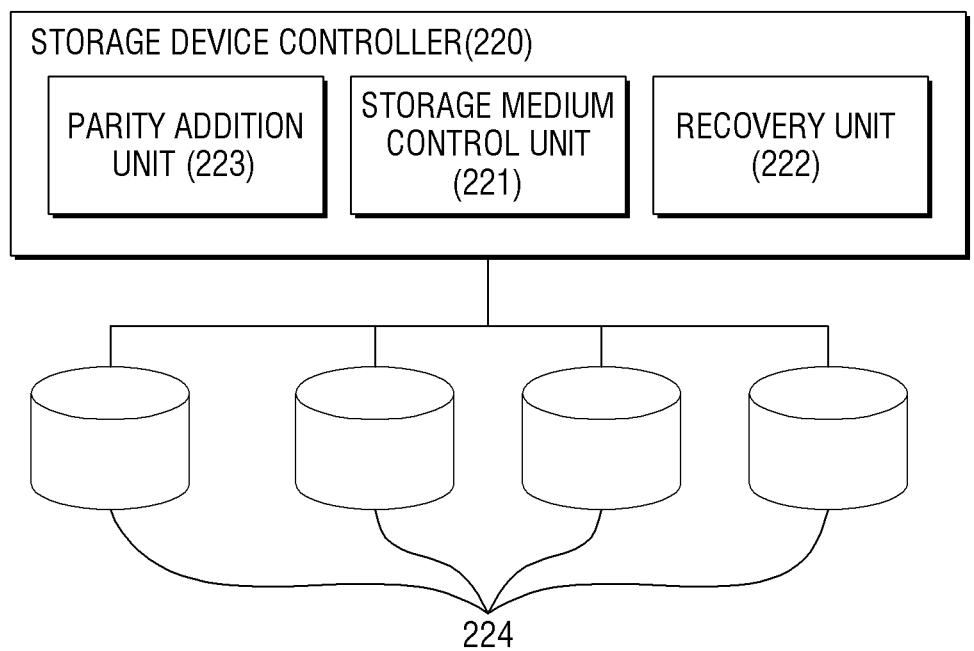
FIG. 3 is a block diagram illustrating a configuration of a main storage device included in an image management device according to an example embodiment.

FIG. 3 is a block diagram illustrating the configuration of the main storage device 22 included in the image management device 2 according to an example embodiment.

As shown in FIG. 3, the main storage device 22 may include a storage device controller 220 and a plurality of storage media 224. The storage device controller 220 may be embodied as one or more processors.

The storage device controller 220 may allow the plurality of storage media 224 to be integrally combined and to be logically recognized as one storage medium. The storage device controller 220 may perform operations of writing and reading data in the plurality of storage media 224 and may use a redundant array of inexpensive disks or a redundant array of independent disks (RAID) scheme. The storage device controller 220 may be provided with a substrate to which the storage medium 224 is connected. Alternatively, the main storage device 22 may include a separate substrate for the storage device controller 220 such that the plurality of storage media 224 are connected to the separate substrate.

RAID is a scheme of obtaining an effect of one high capacity and high performance storage device by integrally combining the plurality of storage media 224. An HDD is mainly used as the component storage medium 224, and other types, such as an SSD, may be used as the storage medium 224. Partial replicated data may be divided and stored in the plurality of storage media 224 (mirroring), and one piece of data may be divided and stored in the plurality of storage media 224. For example, logical disk volumes may be replicated onto separate physical hard disks in real time to ensure continuous availability, via disk mirroring. Parity may be distributed and disposed for integrity check. Therefore, fast data transmission and storage may be performed (high performance), and the RAID may be stably and continuously used without stopping an operation due to an error (stability). A configuration of the RAID is classified into levels 0 to 6 according to operation methods, and the operation methods may be divided according to which of the above-described high performance and stability is more emphasized.

Due to such advantages, and, in particular, stability, the configuration of the RAID configuration is widely used in a storage device configured to store an image of the monitoring camera 3, such as an NVR or a DVR, in which data is continuously input and output and needs to be stored without discontinuity.

In order for the RAID to be configured, a RAID controller may be required to combine the plurality of storage media 224 into a configuration of the RAID and to integrate and manage data input into and output from the plurality of storage media 224. When the main storage device 22 is configured using the RAID, the storage device controller 220 becomes the RAID controller.

The storage device controller 220 may include a storage medium control unit 221, a recovery unit 222, and a parity addition unit 223.

The storage medium control unit 221 may integrally combine the plurality of storage media 224 and distribute and store data input to the main storage device 22 in the plurality of storage media 224. In addition, the storage medium control unit 221 may read and/or retrieve data distributed in the plurality of storage media 224 and transfer completed data to the second communication interface 21 or the like which requests data to the main storage device 22.

When the recovery unit 222 receives a control signal including a command for performing recovery from the recovery control unit 23, the recovery unit 222 recovers the main storage device 22. When the recovery is rebuilding, an integrated configuration of the plurality of storage media 224 is reconfigured (or rebuilt). Accordingly, during the rebuilding, data originally stored in the plurality of storage media 224 is stored so as to be suitable for a combining scheme of the plurality of newly configured storage media 224. In addition, when the recovery is completed, the recovery unit 222 transfers a signal for notifying that the recovery is completed to the recovery control unit 23. In addition, the recovery unit 222 may further transfer information necessary for recovery.

The parity addition unit 223 is a component that adds parity, which is a bit to be added to data input for integrity check when the plurality of storage media 224 are integrally combined. The parity added by the parity addition unit 223 is stored in the plurality of storage media 224 together with the data and becomes a clue capable of recovering original data even when some of the plurality of storage media 224 breaks down. The parity may be exclusively stored in only one storage medium 224 or may be distributed and stored in the plurality of storage media 224.

The plurality of storage media 224 may be a device configured to store data and may include a hard disk, but the present embodiment is not limited thereto. The plurality of storage media 224 may include other types of storage media 224 such as an SSD, a compact flash (CF) card, and a secure digital (SD) card.

Hereinafter, a configuration of the camera 3 will be described in more detail with reference to FIG. 4.

Figure 4:
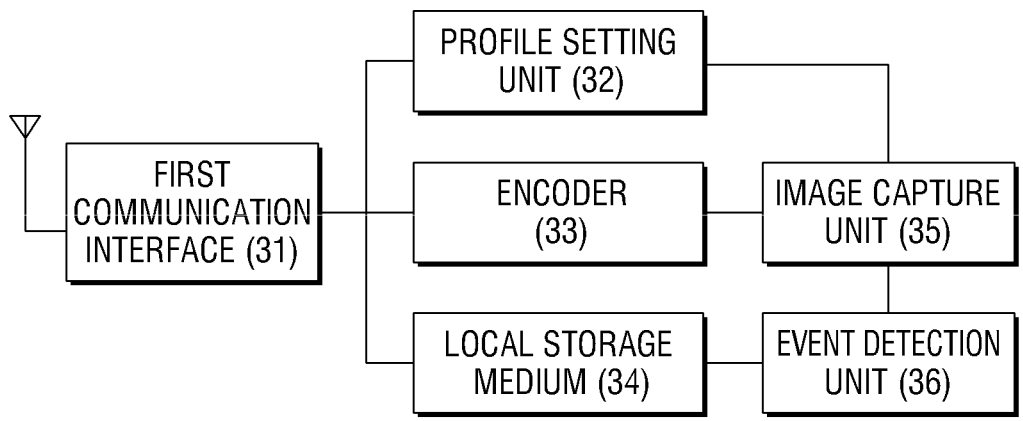
FIG. 4 is a block diagram illustrating a configuration of a camera of a monitoring camera system according to an example embodiment.

FIG. 4 is a block diagram illustrating the configuration of the camera 3 of the monitoring camera system 1 according to an example embodiment.

Referring to FIG. 4, the camera 3 includes the first communication interface 31, the profile setting unit 32, an encoder 33, the image capture unit 35, and the local storage medium 34. The camera 3 may further include an event detection unit 36 according to some example embodiments. The profile setting unit 32, the encoder 33, and the event detection unit 36 may be included in one or more processors. The image capture unit 35 may referred to as a camera, and in that case, the camera 3 may be referred to a camera device, a security system, or an electronic device.

The first communication interface 31 is a component that interworks with the image management device 2 shown in FIG. 1 and transmits a captured image to the image management device 2. The second communication interface 21 is included in the image management device 2 so as to correspond to the first communication interface 31. Information exchangeable between the first communication interface 31 and the second communication interface 21 and operations thereof are the same as those described in the second communication interface 21.

The first communication interface 31 may be connected to the second communication interface 21 in a wired or wireless manner or through a network. Therefore, a network module constituting the first communication interface 31 may include a 3G modem or an LTE modem, which is a wireless network module and may use other methods such as ZigBee, WLAN, and Bluetooth. In addition, a wired network module may include an Ethernet card (or an network interface controller (NIC) card) or a chip, but the present embodiment is not limited thereto.

The profile setting unit 32 is a component that sets a profile which is a format in which the image capture unit 35 captures an image of a surrounding region. The profile is determined by resolution for expressing fineness of an image as the number of total pixels constituting the image, a codec which is an algorithm for coding and decoding the image, or a frame rate determined as frames per second and indicating a rate at which images are captured, but factors for determining the profile are not limited thereto.

A resolution of the profile settable by the profile setting unit 32 may be a video graphics array (VGA) of 640×480, an extended graphics array (XGA) of 1,024×768, a 2K resolution of 2,048×1,080, or a 4K resolution of 4,096×1,716, but the present embodiment is not limited thereto. A codec of the profile settable by the profile setting unit 32 may be moving picture experts group (MPEG)-1/2/4, DivX, AC3, XviD, or H.263/264, but the present embodiment is not limited thereto. A frame rate of the profile settable by the profile setting unit 32 may be 24 frames per second (fps), 30 fps, or 60 fps, or the like, but the present embodiment is not limited thereto.

The profile is determined using such determinants as parameters. Although images with the same length are converted into data according to characteristics of each of the determinants, sizes of capacity occupied in the storage medium 224 by the images are different. Thus, when an image is captured using different profiles, a length of the image, which is storable in the same remaining capacity, may differ.

When a control signal for generating a new profile is received from the calculation unit 24, the profile setting unit 32 adjusts the determinants to generate a new profile and transfers the generated new profile to the image management device 2 through the first communication interface and the second communication interface 21. In addition, when a control signal for capturing an image according to a certain profile is received from the image management device 2, the certain profile is transferred to the image capture unit 35 such that the image capture unit 35 captures an image according to the certain profile. The method and sequence of adjusting the resolution, the codec, and the frame rate, which are the determinants, will be described in more detail with reference to FIGS. 6 and 7.

The image capture unit 35 has a configuration of a general camera 3. The image capture unit 35 is generally located on the front of the camera 3 and includes a lens system configured to receive and concentrate light and an image sensor configured to obtain an effective signal from the light concentrated by the lens system. The image capture unit 35 may further include an additional optical filter such as a day/night (D/N) filter. The image sensor may be a charge-coupled device (CCD), a complementary metal-oxide semiconductor (CMOS), or the like, but the present embodiment is not limited thereto.

The image capture unit 35 captures an image according to a profile generated by the profile setting unit 32. The image capture unit 35 transfers the captured image to the encoder 33 such that the captured image is converted into a storable form.

The encoder 33 is a component that converts an optical signal recognized by the image sensor into a storable form and may include a video encoder such as a VGA encoder. The optical signal is stored in or transmitted through the video encoder and is processed into the form of data that is able to be reproduced.

The local storage medium 34 is a component that receives and stores data which is converted from the image captured by the image capture unit 35 through the encoder. The local storage medium 34 includes the storage medium 224 capable of storing data. The storage medium 34 may be an HDD, an SSD, a CF card, or an SD card, but the present embodiment is not limited thereto.

However, the local storage medium 34 may not store all images captured by the image capture unit 35 and determines whether or not to store the images according to the situation. As described above, when the recovery is not performed, the captured image is transferred and stored in the main storage device 22. Accordingly, when a profile for capturing an image is determined in a state in which the recovery is performed, an image captured according to the profile starts to be stored in the local storage medium 34 from a time at which the recovery is performed.

Since it is no longer necessary to store the captured image in the local storage medium 34 when the recovery is completed, the captured image stored during the recovery is transferred in the recovered main storage device 22 through the first communication interface 31 and the second communication interface 21, and storing of the captured image in the local storage medium 34 is discontinued.

The event detection unit 36 detects an event, such as a change in the position of an object relative to its surroundings, or a change in the surroundings relative to an object. An event means a case in which a certain degree or more of motion or a remarkable change occurs in a monitoring region of the camera 3. When the event does not occur in the monitoring region, even though the camera 3 monitoring a certain region captures and stores an image, there is no meaningful content. Thus, the monitoring is meaningless. Therefore, a method of saving a storage space and power by storing the captured image only when the event occurs may be taken into consideration.

A passive infrared (PIR) sensor capable of sensing a motion with low power consumption and a cadmium sulfide (CdS) sensor capable of determining illumination and day/night may be provided in order to transfer a signal to the local storage medium 34 when an event occurs. However, the present embodiment is not limited thereto, and various sensors such as a thermal sensor may be used.

The event detection unit 36 is disposed in the same direction in which the image capture unit 35 of the camera 3 is oriented. The event detection unit 36 may detect an event occurring within a range to be photographed and may prevent unnecessary photographing. The event detection unit 36 may detect a certain degree or more of motion as an event and may transmit a signal indicating an event detection result to the local storage medium 34. According to an example embodiment, when an event does not occur, the event detection unit 36 allows the local storage medium 34 to not store a captured image or allows the image capture unit 35 to not be operated. Only when a signal indicating that an event occurs is received from the event detection unit 36, the event detection unit 36 may operate the image capture unit 35 or instruct the local storage medium 34 to store an image captured for a certain period of time by the image capture unit 35. Due to the selective operation of the image capture unit 35 or the local storage medium 34 by the event detection unit 36, power may be saved, and the small remaining capacity of the local storage medium 34 is possible for effectively monitoring.

The profile setting unit 32, the recovery control unit 23, the calculation unit 24, the parity addition unit 223, the storage medium control unit 221, and the recovery unit 222 should be able to perform a basic logical operation and thus may include semiconductor devices, such as a central processing unit (CPU), a microcontroller unit (MCU), a microprocessor, a field programmable gate array (EPGA), and the like which are capable of performing a logic operation, but the present embodiment is not limited thereto.

Hereinafter, an overall driving process of the monitoring camera system 1 will be described with reference to FIG. 5. An example of recovery will be described through rebuilding of an integrated configuration of the plurality of storage media 224 with reference to FIGS. 5 to 7.

Figure 5:
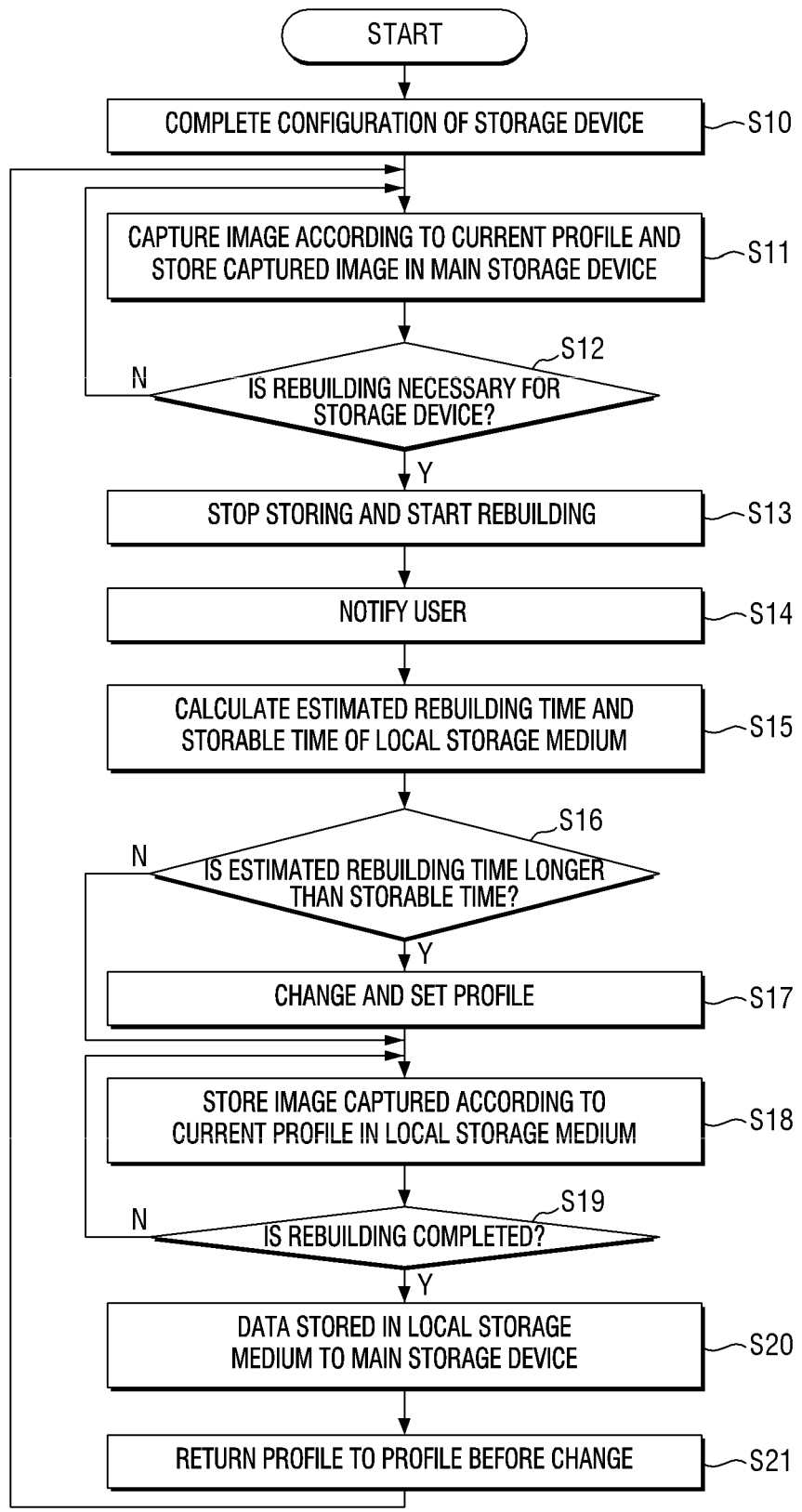
FIG. 5 is a flowchart of a driving process of a monitoring camera system according to a first example embodiment.

FIG. 5 is a flowchart of a driving process of the monitoring camera system 1 according to the first example embodiment.

In order to constitute the monitoring camera system 1, the camera 3 and the image management device 2 are provided and connected, thereby completing the constitution of the monitoring camera system 1.

Referring to FIG. 5, an operation of integrally combining the plurality of storage media 224 included in the main storage device 22 may be completed in order to operate the monitoring camera system 1, in operation S10. The recovery unit 222 may perform the operation of integrally combining the plurality of storage media 224 such that the image management device 2 logically recognizes the main storage device 22 as one mass storage medium or other devices may perform the operation in an initialization operation of the image management device 2.

After an integrated configuration of the main storage device 22 is completed, the main storage device 22 is ready to store an image. Thus, the image capture unit 35 of the camera 3 captures an image of a surrounding region according to a first profile set as an initial value. The captured image is converted into the form of data that is storable through the encoder and is transferred and stored in the main storage device 22 through the first communication interface 31 and the second communication interface 21, in operation S11. In the main storage device 22, the storage medium control unit 221 included in the storage device controller 220 may add parity and may distribute and store the received data in the plurality of storage media 224.

While an image is stored in the main storage device 22, the recovery control unit 23 of the image management device 2 may determine whether rebuilding is necessary for the main storage device 22 using information received from the main storage device 22, in operation S12. Operation S12 also includes determining whether rebuilding is necessary for a configuration of the plurality of storage media 224 included in the main storage device 22. Factors for determining whether the rebuilding is necessary may include a change in the storage medium 224, an error in data stored on the storage medium 224, an external impact, a defect due to sudden power cut-off, a degradation of an HDD, and an error of the main storage device 22 itself, but the present embodiment is not limited thereto.

When the recovery control unit 23 determines that the rebuilding is not necessary for the main storage device 22 in operation S12, an image is continuously captured according to a current profile (first profile), and an operation of storing the captured image in the main storage device 22 is repeated.

When the recovery control unit 23 determines that the rebuilding is necessary for the main storage device 22, the recovery control unit 23 transfers a control signal such that the main storage device 22 stops an operation of storing a captured image and transfers a command for rebuilding the main storage device 22 to the recovery unit 222 to allow the recovery unit 222 to rebuild the main storage device 22, in operation S13. Operation S13 includes rebuilding the configuration of the plurality of storage media 224. This is because, when the rebuilding is necessary for the main storage device 22, the captured image is not properly stored in the main storage device 22, or the idle storage medium 224 is generated, and thus, the image should no longer be stored in the main storage device 22. Therefore, storing of the main storage device 22 is stopped, and the rebuilding is performed on the main storage device 22.

The recovery control unit 23 transfers a control signal and rebuilding information to a notification unit 25 so as to notify a user of operation S13 and that the rebuilding is being performed. The notification unit 25 receiving the control signal may notify the user of a fact that the rebuilding is being performed on the image management device 2 using a message through an short message service (SMS), a multimedia message service (MMS), or an email and may notify the user of the fact by flashing a lighting device such as a light-emitting diode (LED), in operation S14. The user may know through the notification that the rebuilding is currently being performed on the main storage device 22 and may take appropriate measures according to the notification.

The calculation unit 24 receives a control signal for performing calculation, receives data (information) that is a base for calculating an estimated rebuilding time from the recovery control unit 23, and calculates an estimated rebuilding time based on the information in operation S15. The data that is the base for calculating the estimated rebuilding time may include a method of integrally combining the plurality of storage media 224, an amount of data currently stored in the main storage device 22, the number of the plurality of storage media 224 included in the main storage device 22, a state of each component of the main storage device 22, and external factors, but the present embodiment is not limited thereto.

In addition, the calculation unit 24 calculates a storable time for which an image captured according to a current profile is storable in the local storage medium 34, in operation S15. The calculation unit 24 may receive remaining capacity information of the local storage medium 34 and current profile information from the camera 3 and may calculate the storable time by dividing the remaining capacity with a capacity required for a time when an image is stored according to a current profile. In addition, the storable time may be variously calculated. Specifically, the calculation unit 24 may receive storable time information calculated by the camera 3 and calculate the storable time from the received storable time information, and the calculation unit 24 may separately store profile information, receive only the remaining capacity information of the local storage medium 3, and calculate the storable time.

The calculation unit 24 calculates the estimated rebuilding time and the storable time of the local storage medium 34 through such processes and compares sizes of the estimated rebuilding time and the storable time with each other, in operation S16.

When the estimated rebuilding time is longer than the storable time of the local storage medium 34, the calculation unit 24 transfers a control signal to the profile setting unit 32 through the second communication interface 21 and the first communication interface 31 so as to generate a new profile. The profile setting unit 32 receiving the control signal generates a second profile, which is the new profile, and allows the image capture unit 35 to capture an image according to the second profile, in operation S17.

A criterion for generating the new second profile corresponds to a case in which a time for which an image captured according to the new profile is storable in the local storage medium 34 is longer than or equal to the estimated rebuilding time. The sequence and method of adjusting determinants constituting a profile so as to satisfy the criterion will be described in detail with reference to FIGS. 5 and 6. Accordingly, the second profile generated through a corresponding process becomes a profile in which an image is captured for a time longer than the estimated rebuilding time and is storable in the local storage medium 34. In this case, since the image capture unit 35 is set to operate according to the new profile, a current profile becomes the second profile.

When the estimated rebuilding time is shorter than or equal to the time for which the image captured according to the first profile is storable in the local storage medium 34 or when the time for which the image captured according to the changed second profile is storable in the local storage medium 34 is longer than or equal to the estimated rebuilding time, an image captured according to a current profile starts to be stored in the local storage medium 34, in operation S18. This is because it is determined that the local storage medium 34 is able to sufficiently store the image captured according to the current profile.

While a captured image is stored in the local storage medium 34, the recovery unit 222 rebuilds the main storage device 22. In a state in which the rebuilding is not completed, a captured image is continuously stored in the local storage medium 34, in operation S18.

When the rebuilding is completed in operation S19, the recovery unit 222 transfers a signal indicating that the rebuilding is completed to the recovery control unit 23, and the recovery control unit 23 transfers a control signal to the camera 3 so as to transfer data stored in the local storage medium to the main storage device 22, in operation S20. In addition, a control signal is generated and transferred such that the image capture unit 35 captures an image according to the first profile which is an original profile, and the generated image is not stored in the local storage medium 34 and is transferred and stored in the main storage device 22, in operation S21. This is because it is no longer necessary to store the captured image in the local storage medium 34, an image just needs to be captured according to the original profile, and it is easier to integrally store and manage the image in the main storage device 22.

The monitoring camera system 1 stores an image captured according to the first profile in the main storage device 22 again in operation S11, and returns to operation S12 in which the recovery control unit 23 continuously determines whether rebuilding is necessary for the main storage device 22 in operation S12.

Through such processes, the monitoring camera system 1 according to the first example embodiment may safely store an image captured while the main storage device 22 is rebuilt, and the monitoring camera system 1 may return to an original state thereof after the rebuilding and may store a captured image in the main storage device 22.

Hereinafter, a process of determining a second profile, which is a new profile, according to the first example embodiment, will be described in detail with reference to FIG. 6.

Figure 6:
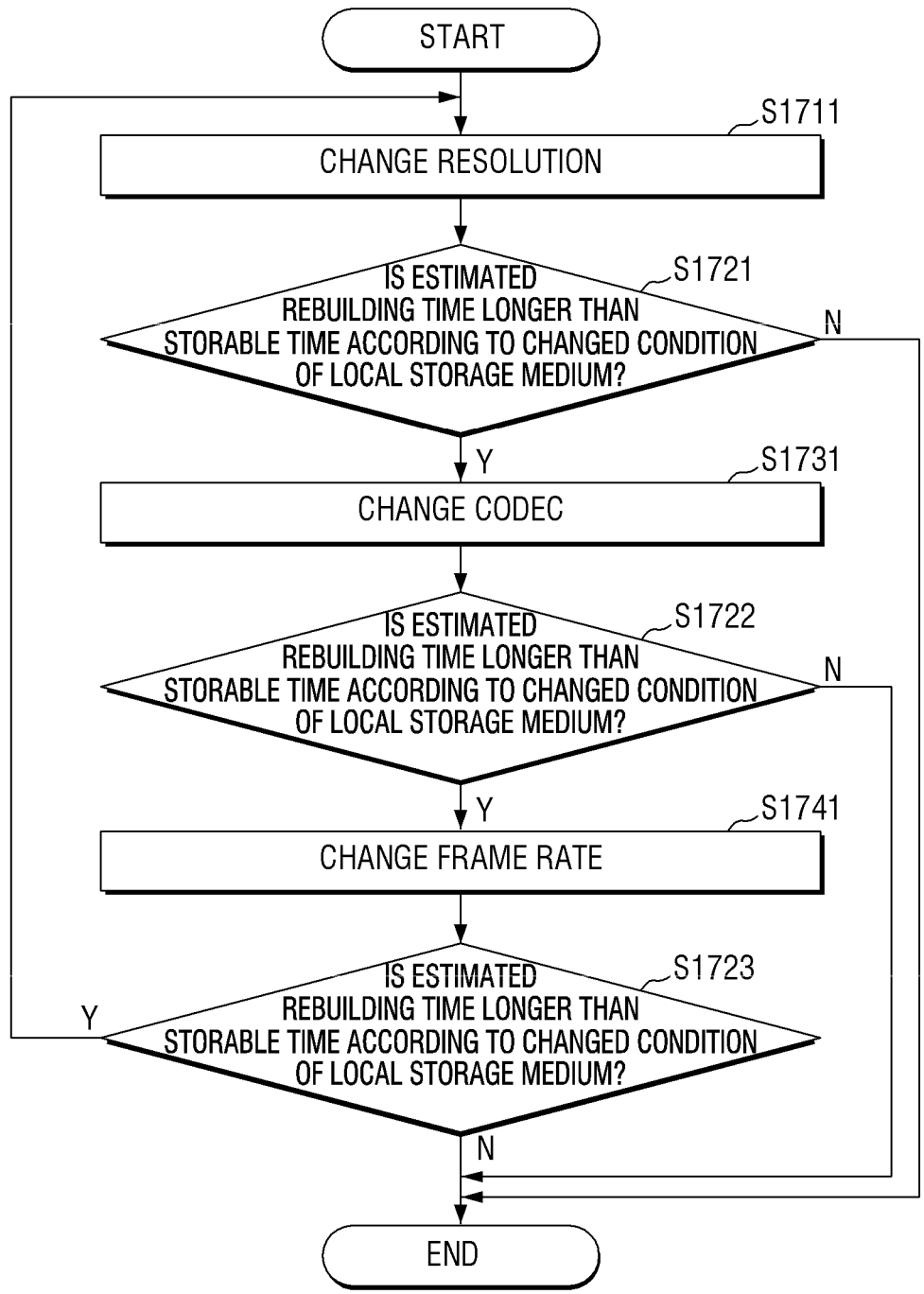
FIG. 6 is a flowchart of a process in which a monitoring camera system determines a new profile according to a first example embodiment.

FIG. 6 is a flowchart of a process in which the monitoring camera system 1 determines a new profile according to a first example embodiment.

Referring to FIG. 6, it can be seen that the process corresponds to operation S17 of changing and setting a profile of FIG. 5.

As described above, the profile setting unit 32 may determine a profile based on various determinants. In the first example embodiment, a process of determining a profile using a resolution, a codec, and a frame rate of an image as main determinants will be described, and even when other determinants are used, a new profile may be determined through a similar process.

When the profile setting unit 32 receives a control signal for changing a current profile into a new profile from the image management device 2, in the first example embodiment, a resolution is changed to generate a new profile in operation S1711. Since the resolution means the number of total pixels constituting an image, as the resolution is decreased, a time, for which a captured image is storable, may be increased. Therefore, the resolution is changed so as to be decreased. Among changeable resolutions, a current resolution may be decreased to a resolution immediately lower than the current resolution and may be decreased to a resolution lower than the immediately lower resolution, but a range in which the current resolution is decreased is not limited thereto.

After the resolution is reduced, a time, for which an image captured according to the generated new profile is storable in the local storage medium 34, is calculated and compared with an estimated rebuilding time in operation S1721. Such a calculation process may be performed in the camera 3 but may be performed by transferring changed profile information to the calculation unit 24 of the image management device 2. When it is determined that the estimated rebuilding time is shorter than or equal to the time for which the image captured according to the changed new profile is storable in the local storage medium 34, the changed new profile becomes a second profile, and a process of generating a profile is completed.

However, if not, a new profile may be generated. Therefore, in the first example embodiment, a codec is changed to generate a new profile in operation S1731. The profile setting unit 32 changes a codec to select a codec having a higher compression ratio among various codecs capable of compressing an image. Among changeable codecs, a current codec may be changed into a codec of which a compression ratio is immediately higher that of the current codec. However, the current codec may be changed into a codec of which a compression ratio is higher than the immediately higher compression ratio, but a range in which the current codec is changed is not limited thereto.

After the codec is changed, a time, for which an image captured according to the generated new profile is storable in the local storage medium 34, is calculated and compared with the estimated rebuilding time in operation S1722. Such a calculation process may be performed in the camera 3 but may be performed by transferring changed profile information to the calculation unit 24 of the image management device 2. When it is determined that the estimated rebuilding time is shorter than or equal to the time for which the image captured according to the changed new profile is storable in the local storage medium 34, the changed new profile becomes a second profile, and a process of generating a profile is completed.

However, if not, a new profile may be generated. Therefore, in the first example embodiment, a frame rate is changed to generate a new profile in operation S1741. The profile setting unit changes a frame rate to select a frame rate having less fps value among frame rates. Among changeable frame rates, a current frame rate may be changed into a frame rate of which an fps value is immediately lower than that of the current frame rate. However, the current frame rate may be changed into a frame rate of which an fps value is lower than the immediately lower fps value, but a range in which the current frame rate is changed is not limited thereto.

After the frame rate is changed, a time, for which an image captured according to the generated new profile is storable in the local storage medium 34, is calculated and compared with the estimated rebuilding time in operation S1723. Such a calculation process may be performed in the camera 3 but may be performed by transferring changed profile information to the calculation unit 24 of the image management device 2. When it is determined that the estimated rebuilding time is shorter than or equal to the time for which the image captured according to the changed new profile is storable in the local storage medium 34, the changed new profile becomes a second profile, and a process of generating a profile is completed.

If not, a new profile may be generated, and the process returns to operation S1711 of changing the resolution. Such a cycle is repeated until a profile with a storable time that is longer than or equal to the estimated rebuilding time is generated. The order of performing operations S1711 and S1721, operations S1731 and S1722, and operations S1741 and S1723 may be changed in an another example embodiment. For example, operations S1731 and S1722 may be performed before operations S1711 and S1721 and S1741 and S1723, or operations S1741 and S1723 may be performed operations S1711 and S1721, and operations S1731 and S1722.

Hereinafter, a process of determining a new profile according to a second example embodiment will be described in detail with reference to FIG. 7.

Figure 7:
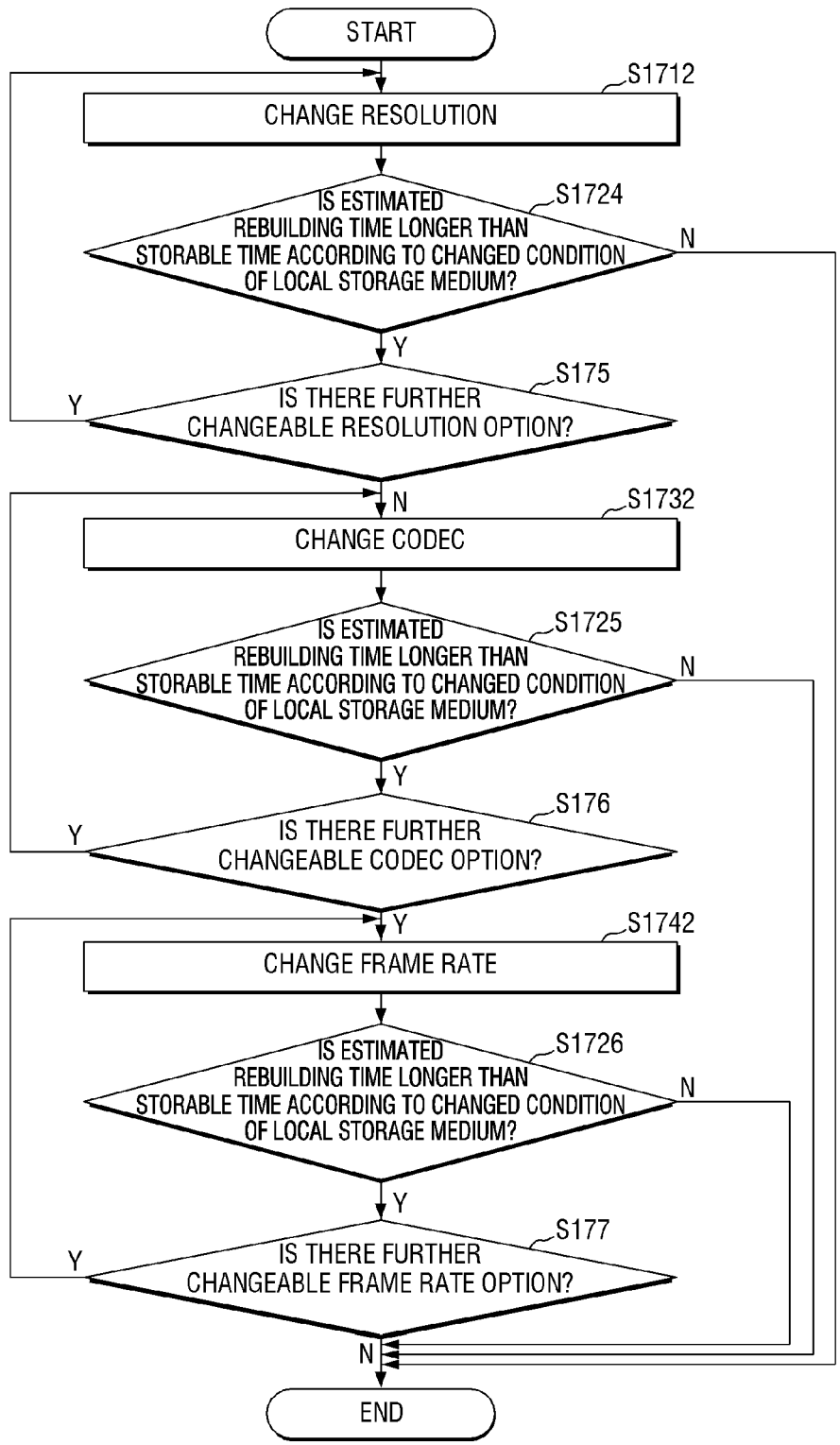
FIG. 7 is a flowchart of a process in which a monitoring camera system determines a new profile according to a second example embodiment.

FIG. 7 is a flowchart of a process in which the monitoring camera system 1 determines a new profile according to the second example embodiment.

Unlike the first example embodiment of FIG. 6, a method of setting a new profile (i.e., a second profile) according to the second example embodiment uses a method of testing one condition and then testing the next condition.

When the profile setting unit 32 receives a control signal for changing a current profile into a new profile from the image management device 2, in the second example embodiment, a resolution is changed to generate a new profile in operation S1712. Since the resolution means the number of total pixels constituting an image, as the resolution is decreased, a storable time for which a captured image is storable is increased. Therefore, the resolution is changed so as to be decreased. Among changeable resolutions, a current resolution may be decreased to a resolution immediately lower than the current resolution and may be decreased to a resolution lower than the immediately lower resolution, but a range in which the current resolution is decreased is not limited thereto.

After the resolution is reduced, a time, for which an image captured according to the generated new profile is storable in the local storage medium 34, is calculated and compared with an estimated rebuilding time in operation S1724. Such a calculation process may be performed in the camera 3 but may be performed by transferring changed profile information to the calculation unit 24 of the image management device 2. When it is determined that the estimated rebuilding time is shorter than or equal to the time for which the image captured according to the changed new profile is storable in the local storage medium 34, the changed new profile becomes a second profile, and a process of generating a profile is completed.

However, when the rebuilding time is longer, it is determined whether there is a further changeable resolution option in operation S175. When there is the further changeable resolution option, the resolution should be further decreased to perform determination. Therefore, the process returns to operation S1712 of changing the resolution, and it is repeatedly determined whether a profile satisfying a condition is obtainable by continuously changing the resolution.

When there is no further changeable resolution option, there is no new profile obtainable by changing the resolution, and thus, the process proceeds to an operation of changing a codec.

For example, the profile setting unit 32 may gradually decrease the resolution until the estimated rebuilding time becomes shorter than or equal to the storage time of the local storage medium 34. However, if the resolution reaches a predetermined minimum resolution, the profile setting unit 32 may stop decreasing the resolution even if the estimated rebuilding time is longer than the storage time of the local storage medium 34, and may proceed to operation S1732.

In the second example embodiment, the codec is changed to generate a new profile in operation S1732. The profile setting unit changes a codec to select a codec having a higher compression ratio among various codecs capable of compressing an image. Among changeable codecs, a current codec may be changed to a codec of which a compression ratio is immediately higher than that of the current codec. However, the current codec may be changed to a codec of which a compression ratio is higher than the immediately higher compression ratio, but a range in which the current codec is changed is not limited thereto.

After the codec is changed, a time, for which an image captured according to the generated new profile is storable in the local storage medium 34, is calculated and compared with the estimated rebuilding time in operation S1725. Such a calculation process may be performed in the camera 3 but may be performed by transferring changed profile information to the calculation unit 24 of the image management device 2. When it is determined that the estimated rebuilding time is shorter than or equal to the time for which the image captured according to the changed new profile is storable in the local storage medium 34, the changed new profile becomes a second profile, and a process of generating a profile is completed.

However, when the rebuilding time is longer, it is determined whether there is a further changeable codec option in operation S176. When there is the further changeable codec option, it is necessary to determine again a case in which a codec having a higher compression ratio is used. Therefore, the process returns to operation S1732 of changing the codec, and it is repeatedly determined whether a profile satisfying a condition is obtainable by continuously changing the codec.

When there is no further changeable codec option, there is no new profile obtainable by changing the codec, and thus, the process proceeds to an operation of changing a frame rate.

In the second example embodiment, the frame rate is changed to generate a new profile in operation S1742. The profile setting unit changes a frame rate to select a frame rate with less frames per second among frame rates. Among changeable frame rates, a current frame rate may be changed into a frame rate of which an fps value is immediately lower than that of the current frame rate. However, the current frame rate may be changed into a frame rate of which an fps value is lower than the immediately lower fps value, but a range in which the current frame rate is changed is not limited thereto.

After the frame rate is changed, a time, for which an image captured according to the generated new profile is storable in the local storage medium 34, is calculated and compared with the estimated rebuilding time in operation S1726. Such a calculation process may be performed in the camera 3 but may be performed by transferring changed profile information to the calculation unit 24 of the image management device 2. When it is determined that the estimated rebuilding time is shorter than or equal to the time for which the image captured according to the changed new profile is storable in the local storage medium 34, the changed new profile becomes a second profile, and a process of generating a profile is completed.

However, when the rebuilding time is longer, it is determined whether there is a further changeable frame rate option in operation S177. When there is the further changeable frame rate option, it is necessary to determine a case in which a frame late having a lower fps value is used again. Therefore, the process returns to operation S1742 of changing the frame rate, and it is repeatedly determined whether a profile satisfying a condition is obtainable by continuously changing the frame rate.

When there is no further changeable frame rate option, there is no new profile obtainable by changing the resolution, the codec, and the frame rate, and thus, a currently obtained profile is generated as a second profile, and an operation of changing a profile is generated.

For example, the profile setting unit 32 may gradually decrease the frame rate until the estimated rebuilding time becomes shorter than or equal to the storage time of the local storage medium 34. However, if the frame rate reaches a predetermined minimum frame rate, the profile setting unit 32 may stop decreasing the frame rate even if the estimated rebuilding time is longer than the storage time of the local storage medium 34, and may use a currently generated profile having the predetermined minimum frame rate, without further updating the profile.

The present embodiment is not limited to the order of the operations illustrated in FIG. 7. For example, operations S1732, S1725, and S176, and operations S1742, S1726, and S177 may be performed before operations S1712, S1724, and S175. Also, operations S1742, S1726, and S177 may be performed before operations S1732, S1725, and S176.

Although not shown in the drawing, even when the lowest resolution, the codec with the highest compression ratio, and the frame rate with the lowest fps value are selected through a method in which the profile setting unit 32 according to the first and second example embodiments determines a new profile, a storable time may be shorter than an estimated rebuilding time. In this case, according to a third example embodiment, a finally obtained profile is set as a new profile, and an image captured according to the new profile by the image capture unit 35 may be stored in the local storage medium 34 during rebuilding. When there is no remaining capacity of the local storage medium 34 and a newly captured image may not be further stored, the oldest stored image may be deleted, and the newly captured image may be stored. Alternatively, the newly captured image may be overwritten in a space in which the oldest stored image is stored. Whenever a newly captured image is input, such a method is repeated. Due to such a method, some images may be lost, but images may be stored for a certain period of time from a tine at which the rebuilding is completed.

Only when an image is captured and stored according to an original profile (first profile), a meaningful image may be obtained. In this case, according to a fourth example embodiment, an image captured according to the original profile is stored in the local storage medium 34 during rebuilding. Similarly, when there is no remaining capacity of the local storage medium 34 and a newly captured image may not be further stored, the oldest stored image may be deleted, and the newly captured image may be stored. Alternatively, the newly captured image may be overwritten in a space in which the oldest stored image is stored. Whenever a newly captured image is input, such a method is repeated. Due to such a method, some images may be lost, but images may be stored for a certain period of time from a time at which the rebuilding is completed.

Only a case in which an image is captured and stored according to an original profile may be meaningful, or although a new profile may not be further generated, a storable time may not be longer than or equal to the rebuilding time. In this case, according to a fifth example embodiment, an image may not be stored during entire rebuilding, and a situation in which an event occurs may be photographed as an image, and the image may be stored in the local storage medium 34. In a configuration of the camera 3 described with reference to FIG. 4, only when the event detection unit 36 detects an event occurring in a monitoring region, the image capture unit 35 is operated or the local storage medium 34 is controlled to store an image captured by the image capture unit 35. Due to the selective operation of the image capture unit 35 or the local storage medium 34 by the event detection unit 36, power may be saved, and the small remaining capacity of the local storage medium 34 is possible for effectively monitoring.

Hereinafter, a method by which a user may set a profile according to a third example embodiment will be described with reference to FIGS. 8 and 9.

Figure 8:
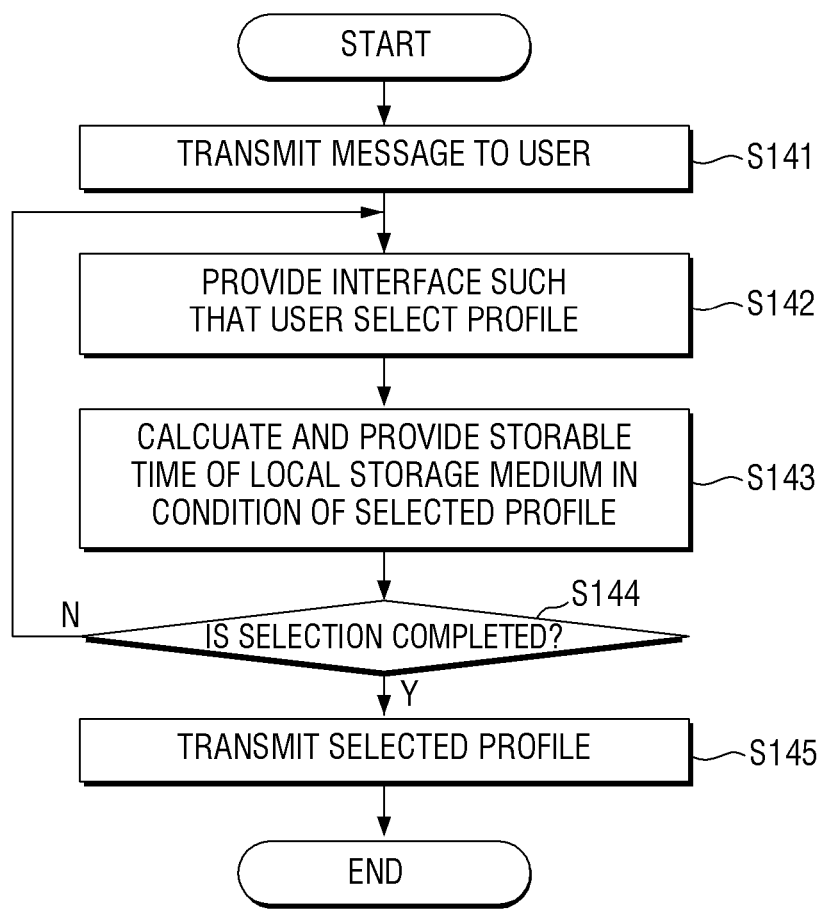
FIG. 8 is a flowchart of a process in which a monitoring camera system determines a new profile according to a third example embodiment.

FIG. 8 is a flowchart of a process in which the monitoring camera system 1 determines a new profile according to the third example embodiment.

Operations of FIG. 8 correspond to modifications of operation S14 of notifying the user, operations S15 and S16 of calculating and comparing the estimated recovery time and the storable time, and operation S17 of changing and setting the profile, and the remaining operations are performed similarly to the first example embodiment.

When it is determined that recovery is necessary, the recovery unit 222 performs recovery, and the notification unit 25 transmits a notification message indicating that the recovery is necessary, to a user in operation S141. In addition to the message transmission, the notification unit 25 may transfer a recovery situation to the user by using a beep sound of a speaker or flashing a lighting device. The user may be notified that the recovery is being performed and may take appropriate measures.

According to the third example embodiment, in order for the user to take appropriate measures, the input interface 26 provides an interface through which the user may select a profile in operation S142. The interface may be provided such that a plurality of profiles are selected therethrough and may be provided such that a resolution, a codec, and a frame rate, which are determinants constituting a profile, are selected, but the present embodiment is not limited thereto. The interface will be described in detail with reference to FIG. 9.

The user selects a new profile or determinants for determining the new profile through the provided interface. The calculation unit 24 calculates a storable time for which an image captured according to the selected new profile or a profile with the selected determinants is storable in the local storage medium 34 and compares the calculated storable time and an estimated recovery time to each other in operation S143. The calculated time may be numerically displayed through the interface of the input interface 26 and may be compared with the estimated recovery time and be provided simply as the phrase "storable" or "unstorable, but the form of provision thereof is not limited thereto.

The user confirms the provided storable time and completes selection of the profile by clicking a selection completion button or the like in operation S144. When the selection completion button is not operated, the user may continuously change the profile in operations S142 and S143. When the selection completion button is operated, the input interface 26 transfers the selected profile or the profile with the selected determinants to the camera 3 through the calculation unit 24, the second communication interface 21, and the first communication interface 31 such that the selected profile or the profile with the selected determinants is selected as a new profile. The image capture unit 35 captures an image according to the new profile, and the captured image is stored in the local storage medium 34 in operation S145.

Figure 9:
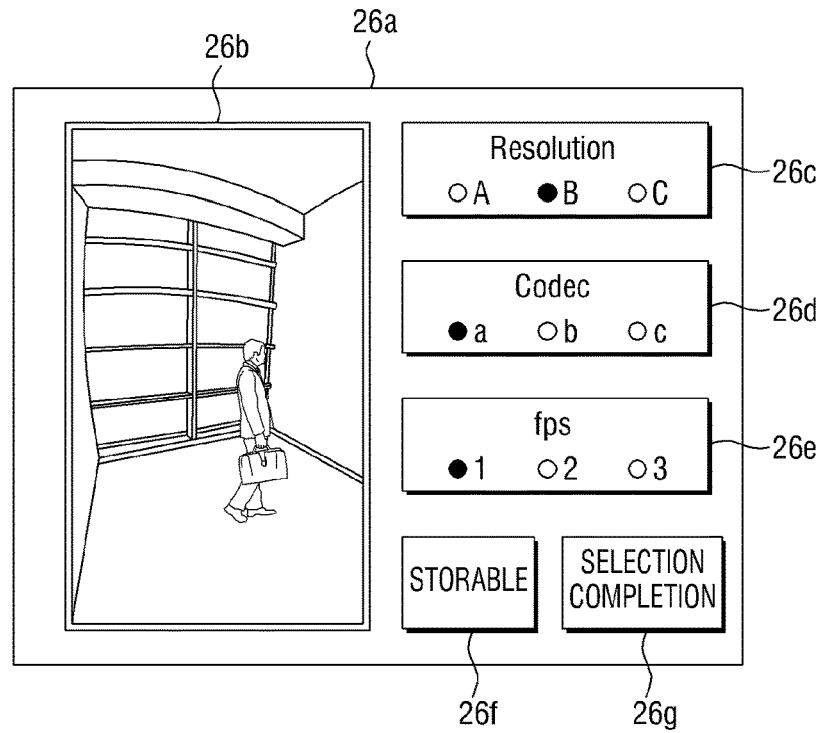
FIG. 9 illustrates an input interface of the monitoring camera system according to the third example embodiment.

FIG. 9 illustrates the input interface 26 of the monitoring camera system 1 according to the third example embodiment.

Referring to FIG. 9, a graphic user interface 26a of the input interface 26 of the monitoring camera system 1 according to the third example embodiment includes a thumbnail 23b of a captured image, a resolution selection unit 23c, a codec selection unit 23d, a frame rate selection unit 23e, a status display unit 23f, and a selection completion button 23g.

The thumbnail 23b is a component that displays a captured image according to a window size. When the captured image is initially displayed, the captured image is displayed according to a current profile. When a user selects determinants of a profile and a new profile is generated, the captured image is displayed according to the generated profile. The thumbnail 23b is used to confirm in advance that any type of image is to be captured according to the profile selected by the user.

The resolution selection unit 23c provides a list of selectable resolutions constituting a new profile such that the user selects the resolutions and is selected by the user. When the user selects a desired resolution from the list of the selectable resolutions, the input interface 26 displays an image captured according to a new profile formed with the selected resolution on the thumbnail and displays a time for which the captured image is storable or whether the captured image is storable according to a corresponding profile on the status display unit 23f. The codec selection unit and the frame rate selection unit 23e are also operated in a similar manner to the resolution selection unit 23c.

The status display unit 23f displays a result of comparing a storable time with an estimated recovery time, wherein the storable time refers to a time for which an image captured according a profile formed with the determinants selected by the resolution selection unit 23c, the codec selection unit, and the frame rate selection unit 23e is storable in the local storage medium 34. The result may be a numerical representation of the storable time or may be displayed as the simple phrase "storable" or "unstorable indicating whether the captured image is sufficiently storable as the comparison result, but the present embodiment is not limited thereto. The user receives assistance in selecting a profile by checking the status display unit 23f.

The selection completion button 23g is a component that is formed to receive user's confirmation that a profile generated according to conditions such as a resolution, a codec, and a frame rate selected by the user is designated and set as a new profile to capture and store an image. Before the selection completion button 23g is selected, it is possible to confirm through the thumbnail and the status display unit 23f whether an image captured according to a corresponding profile is processed or is storable, but the image capture and storage are not performed. However, after the selection completion button 23g is selected to complete selection, a profile selected by the image capture unit 35 is designated as a new profile, an image is captured according to the new profile, and the captured image is stored in the local storage medium 34.

By using the elements and processes described with reference to FIGS. 8 and 9, the user may recognize a recovery situation and select a profile to take appropriate measures.

Figure 10:
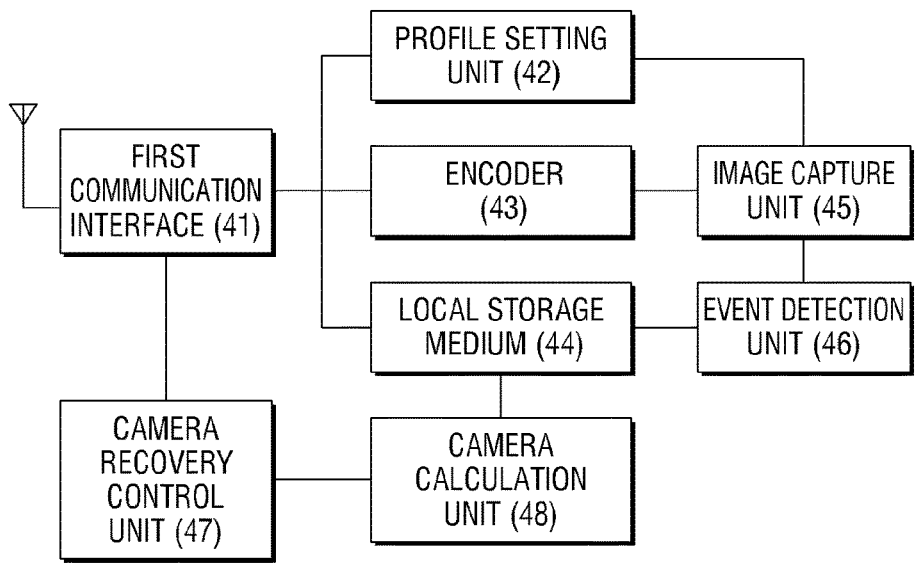
FIG. 10 is a block diagram illustrating a configuration of a camera according to a fourth example embodiment.

FIG. 10 is a block diagram illustrating a configuration of the camera 4 according to the fourth example embodiment.

Referring to FIG. 10, the camera 4 according to the fourth example embodiment includes the first communication interface 41, a profile setting unit 42, an encoder 43, an image capture unit 45, the local storage medium 44, and an event detection unit 46 and may additionally include the camera recovery control unit 47 and the camera calculation unit 48. Since operations of the remaining components except for the camera recovery control unit 47 and the camera calculation unit 48 are substantially the same as the configuration and operation of the camera 3 described above with reference to FIG. 4, only an operation of the additional components will be described.

The camera recovery control unit 47 determines whether the first communication interface 41t has failed, determines whether to recover the first communication interface 41, and functions to generate a control signal for recovering the first communication interface 41. A captured image may not be properly transmitted to the image management device 2 due to the problem of the first communication interface 41. Thus, even in such a case, the captured image may be stored in the local storage medium 44. Therefore, the present example embodiment is the same as other example embodiments except that the camera 4 performs a function of the recovery control unit 23 of the image management device 2 of other example embodiments and an object on which recovery is determined and a control signal is generated is changed into the first communication interface 41.

When the camera recovery control unit 47 generates and transmits a control signal for recovering the first communication interface 41, a communication recovery unit further included in the first communication interface 41 recovers the first communication interface 41 to an original state thereof.

Similarly, the present example embodiment is the same as other example embodiments except that the camera 4 includes a camera calculation unit 48 and performs a function of the calculation unit 24 of the image management device 2 of other example embodiments and an object to be recovered is changed into the first communication interface 41. Therefore, a storable time for which a captured image is storable in the local storage medium is calculated and compared with an estimated recovery time of the first communication interface 41.

The camera calculation unit 48 transfers determination contents to the camera recovery control unit 47. When the estimated recovery time is shorter than or equal to the storable time, the camera recovery control unit 47 allows the captured image to be stored according to a current first profile in the local storage medium 44. When the estimated recovery time is longer, the camera calculation unit 48 transfers a control signal such that a profile setting unit 42 generates a second profile in which the storable time is shorter than the estimated recovery time. When the profile setting unit 42 generates the second profile, the camera recovery control unit 47 allows the local storage medium 44 to store an image captured according to the second profile. A method of generating the second profile is the same as that described in FIGS. 6 and 7.

Since it is no longer necessary to store the captured image in the local storage medium 44 when the recovery is completed, the captured image stored during the recovery is transferred through the first communication interface 41, and storing of the captured image in the local storage medium 44 is discontinued.

Therefore, even when a problem occurs in the transmission of the image captured through such processes, the captured image may be backed up in the local storage medium 44.

While not restricted thereto, an example embodiment can be embodied as computer-readable code on a computer-readable recording medium. The computer-readable recording medium is any data storage that can store data that can be thereafter read by a computer system. Examples of the computer-readable recording medium include read-only memory (ROM), random-access memory (RAM), CD-ROMs, magnetic tapes, floppy disks, and optical data storages. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing example embodiments are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A monitoring camera system comprising:
a camera device comprising:
a camera configured to capture an image according to a first camera profile;
a local storage medium configured to store the image; and
a first communication interface configured to transmit the image;
a main storage device configured to store the image that is transmitted from the first communication interface; and
one or more processors comprising:
a recovery control unit configured to determine whether a recovery of the main storage device is necessary and generate a control signal to recover the main storage device in response to determining that the recovery of the main storage device is necessary; and
a calculation unit configured to calculate a storable time for which the image captured according to the first camera profile is storable in the local storage medium in response to determining that the recovery of the main storage device is necessary, and compare the calculated storable time with an estimated recovery time for recovering the main storage device.

2. The monitoring camera system of claim 1, wherein, when the estimated recovery time is shorter than or equal to the calculated storable time, the local storage medium starts to store the image captured according to the first camera profile, and
the main storage device comprises a recovery unit configured to recover the main storage device in response to the control signal.

3. The monitoring camera system of claim 1, wherein, the camera device further comprises a profile setting unit configured to, in response to determining that the estimated recovery time is longer than the calculated storable time, generate a second camera profile for capturing another image that is storable in the local storage medium for a time shorter than or equal to the estimated recovery time,
the local storage medium starts to store the image captured according to the second camera profile, and
the main storage device comprises a recovery unit configured to recover the main storage device in response to the control signal.

4. The monitoring camera system of claim 3, wherein the profile setting unit is further configured to generate the second camera profile based on criteria including at least one of a resolution, a codec, and a frame rate.

5. The monitoring camera system of claim 4, wherein the profile setting unit is further configured to sequentially adjust the criteria to generate the second camera profile.

6. The monitoring camera system of claim 2, wherein, when the recovery is completed, the image stored in the local storage medium is transferred to the main storage device through the first communication interface, and
the main storage device starts to store the image captured according to the first camera profile.

7. The monitoring camera system of claim 1, wherein the one or more processors further comprise a notification unit configured to transmit a message to a user when the control signal for receiving the main storage device is generated.

8. The monitoring camera system of claim 1, further comprising an input interface to allow a user to select a camera profile from a plurality of profiles comprising the first camera profile, in response to the estimated recovery time being longer than the calculated storable time.

9. The monitoring camera system of claim 1, wherein the camera device is further configured to detect an event, and capture the image in response to the event being detected.

10. The monitoring camera system of claim 1, wherein, when the estimated recovery time is longer than the calculated storable time, the local storage medium starts to store the captured image,
the main storage device comprises a recovery unit configured to recover the main storage device in response to the control signal, and
when a remaining capacity of the local storage medium runs out before the main storage device is recovered, the camera device deletes an oldest image among a plurality of images stored in the local storage medium.

11. A monitoring method comprising:
- storing an image captured by a camera in a main storage device;
- starting to recover the main storage device in response to determining that a recovery of the main storage device is necessary; and
- when the recovery is started, calculating a storable time for which the image captured according to a current camera profile is storable in a local storage medium of the camera and comparing the calculated storable time with an estimated recovery time for recovering the main storage device.

12. The monitoring method of claim 11, further comprising, when the estimated recovery time is shorter than or equal to the calculated storage time, starting to store the captured image in the local storage medium.

13. The monitoring method of claim 11, further comprising, when the estimated recovery time is longer than the calculated storage time, generating a second camera profile for capturing another image that is storable in the local storage medium for a time shorter than or equal to the estimated recovery time, and
- starting to store, in the local storage medium, the image captured according to the second camera profile.

14. The monitoring method of claim 12, wherein the current camera profile is a first camera profile, and
- the monitoring method further comprises, when the recovery is completed, transferring the image stored in the local storage medium to the main storage device through a first communication interface, and resuming storing the image captured according to the first camera profile, in the main storage device.

15. The monitoring method of claim 13, wherein the generating the second camera profile includes sequentially adjusting criteria for generating the second camera profile, wherein the criteria comprise a resolution, a codec, and a frame rate for generating the second camera profile;
the monitoring method further comprises:
- calculating another storable time for which another image captured according to the second camera profile is storable in the local storage medium;
- comparing the storable time calculated based on the second camera profile with the estimated recovery time; and
- when the storable time calculated based on the second camera profile is longer than or equal to the estimated recovery time, storing the image captured according to the second camera profile, in the local storage medium.

16. The monitoring method of claim 15, wherein the generating the second camera profile includes sequentially adjusting the resolution, the codec, and the frame rate.

* * * * *